United States Patent
Yingling et al.

(10) Patent No.: US 7,258,366 B2
(45) Date of Patent: Aug. 21, 2007

(54) WHEEL SPLASH AND SPRAY SUPPRESSOR

(75) Inventors: Kerry E. Yingling, Fort Wayne, IN (US); David J. Beigel, Payne, OH (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 346 days.

(21) Appl. No.: 10/969,655

(22) Filed: Oct. 20, 2004

(65) Prior Publication Data

US 2006/0082130 A1    Apr. 20, 2006

(51) Int. Cl.
*B62D 25/18* (2006.01)
(52) U.S. Cl. ............... 280/851; 280/847; 280/159; 280/160; 296/198
(58) Field of Classification Search ............ 280/151.1, 280/151.2, 151.3, 159, 160, 847, 848, 851; 296/198
See application file for complete search history.

(56) References Cited

U.S. PATENT DOCUMENTS

| 3,337,238 | A | * | 8/1967 | Weasel, Jr. .................. 280/851 |
| 4,927,177 | A | * | 5/1990 | Price .......................... 280/851 |
| 5,593,167 | A | * | 1/1997 | Barnhardt et al. ....... 280/164.1 |
| 6,193,278 | B1 | * | 2/2001 | Ward et al. ................. 280/848 |
| 2005/0275212 | A1 | * | 12/2005 | Angelaitis ................... 280/847 |

* cited by examiner

*Primary Examiner*—Christopher P. Ellis
*Assistant Examiner*—Katy Meyer
(74) *Attorney, Agent, or Firm*—Jeffrey P. Calfa; Gerald W. Askew; Susan L. Lukasik

(57) ABSTRACT

A one-piece synthetic splash and spray suppressor (50) is fastened to the margin of the trailing edge (48) of a front wheel well, or fender, (24) of a vehicle (10) to suppress road splash and spray created by a wheel within the well or fender from hitting steps (40, 42) by which a driver climbs into a cab (36). A wall (58) of the suppressor forms a continuation of an eyebrow (46) in the wheel well, or fender.

16 Claims, 6 Drawing Sheets

WHEEL SPLASH AND SPRAY SUPPRESSOR

FIELD OF THE INVENTION

This invention relates to wheeled vehicles, particularly to an accessory for association with a vehicle body at a fender or wheel well in order to aid in suppressing splash and spray created by the action of a wheel within the fender or wheel well on a wet or muddy surface along which the vehicle is traveling.

FIELD OF THE INVENTION

Mud flaps are common accessories for motor vehicles such as trucks and for non-motor vehicles, such as trailers, that are towed by motor vehicles. Typically, a mud flap is attached to a part of the vehicle such that the mud flap is disposed behind one of the wheels. The primary purpose of a mud flap is of course to block some of the splash and spray created by the action of the wheel on a wet or muddy surface along which the vehicle is traveling. Mud flaps are also typically made from rubber to have rectangular shapes, and while such a mud flap is typically securely attached to a vehicle and rigid enough to withstand wind, it is apt to have some flexibility.

A mud flap may be associated with any wheel of a vehicle where it is needed, provided that there is enough room for it and that there is a suitable part or parts of the vehicle available for fastening the flap to it or them. Depending on factors like available space, tire size, and flap size and shape, a flap may not always provide the optimum intended protection against splash and spray. For example, mud flaps that are placed behind front wheels of certain large trucks that often operate off-road in severe service applications, may not provide adequate protection for steps and portions of the cab that are directly behind them.

Apart from its functional aspects, a mud flap is sometimes also decorative in the sense that it may be colorized in certain ways and/or have ornamental features like decorative studs or light reflectors.

It is believed that an accessory part that can provide better suppression of splash and spray and at the same time better harmonize in appearance with certain vehicle body styling features would be a beneficial improvement. This would be especially true in the case of the front wheels of a severe service vehicle.

SUMMARY OF THE INVENTION

Briefly, the present invention relates to an injection-molded splash and spray suppressor part that attaches to the vehicle at the rear of a front wheel well or fender. The wheel well or fender has an eyebrow which apart from any functionality provides a styling feature for the vehicle. The splash and spray suppressor forms a circumferential continuation of the wheel well, including a circumferential continuation of the eyebrow, that provides improved protection of portions of the vehicle directly behind the wheel well or fender such as steps leading to the cab of the vehicle.

One generic aspect of the present invention relates to a land vehicle comprising a chassis comprising wheels on which the vehicle travels and a body that is supported on the chassis and comprises a wheel well overlying a portion of the circumference of one of the wheels in spaced relation to the one wheel and ending at a trailing edge that is rearward of the one wheel when a centerline about which the one wheel revolves as the vehicle is traveling in a straight line is perpendicular to the direction of travel. At least a laterally outboard portion of the wheel well is formed by one or more exterior body panels to endow the wheel well with a downwardly concave laterally outboard margin, including a laterally outboard protruding eyebrow, extending to the trailing edge. A further part, the splash and spray suppressor, is attached to the vehicle in association with the wheel well to form a circumferential continuation of the wheel well, including a circumferential continuation of the eyebrow, from the trailing edge.

Another generic aspect relates to a land vehicle comprising a chassis comprising wheels on which the vehicle travels and a body that is supported on the chassis and comprises one or more parts forming a front fender having a downwardly facing, concave, laterally outboard margin that includes a laterally outwardly protruding eyebrow in spaced relation to a portion of the circumference of a front one of the wheels and ending at a trailing edge that is rearward of the front one of the wheels when a centerline about which the front one of the wheels revolves as the vehicle is traveling in a straight line is perpendicular to the direction of travel. A further part is attached to, and extends from the trailing edge of, the fender to form a circumferential continuation of the fender, including a circumferential continuation of the eyebrow.

Still another generic aspect relates to a wheel splash and spray suppressor for disposition on a land vehicle at the rear of a wheel opening in a body of the vehicle to present a barrier to splash and spray created by the action of a wheel disposed within the opening on a wet or muddy surface along which the vehicle is traveling and also provide a continuation of a laterally outboard protruding eyebrow defined in one or more body parts that form a laterally outboard margin of the wheel opening. The suppressor comprises a generally vertical, generally rectangular, first wall that, when the suppressor is disposed on a land vehicle, is generally parallel to the wheel centerline when the vehicle is traveling in a straight line, a generally vertical second wall that, when the suppressor is disposed on a land vehicle, extends forward of an outboard side of the first wall, and a third wall that, when the suppressor is disposed on a land vehicle, forms the continuation of the eyebrow extending along a side of the second wall opposite the first wall.

A further aspect relates to a method of making the suppressor.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
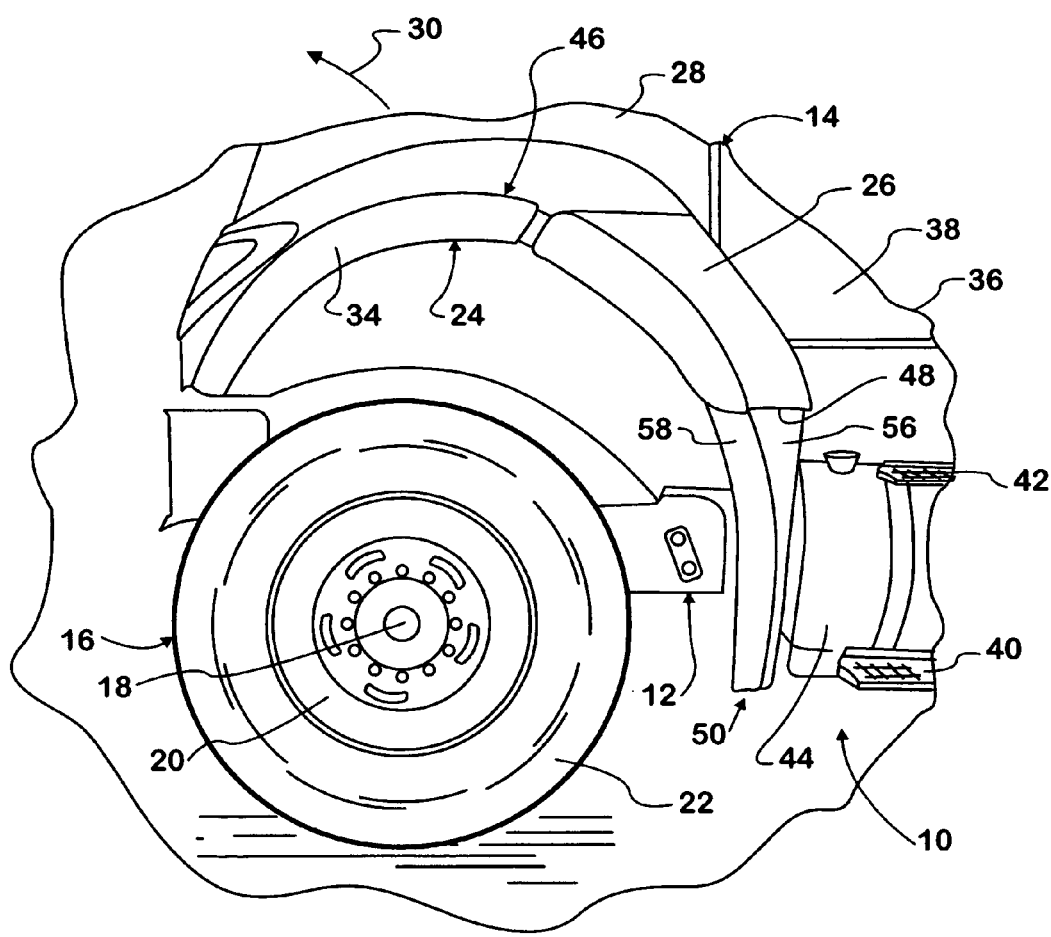
FIG. 1 is a side elevation view of the left front wheel of a truck including portions of the truck and the accessory part of the present invention.
Figure 2:
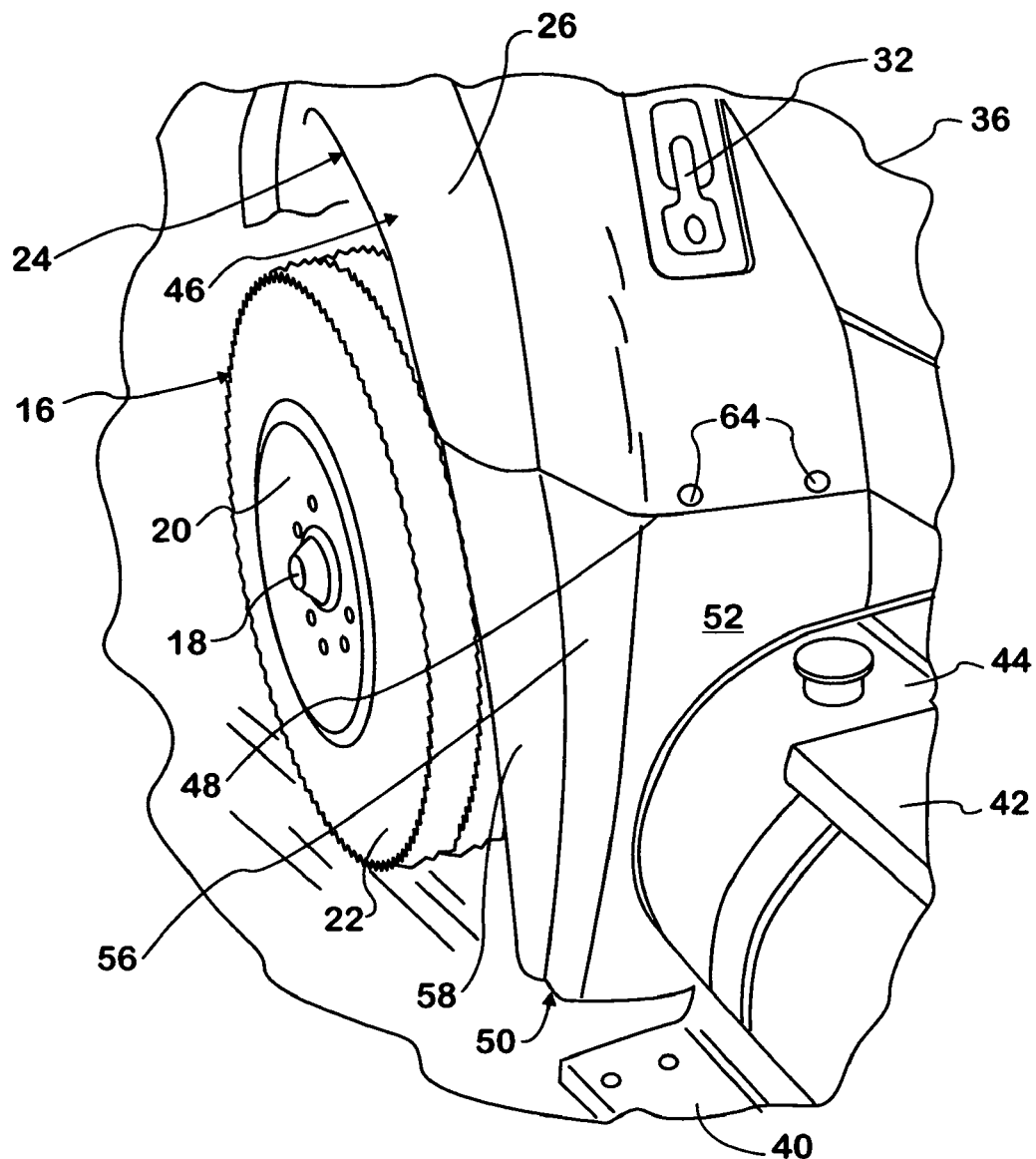
FIG. 2 is a view similar to FIG. 1 looking from a different angle.

FIGS. 1 and 2 show a portion of a motor vehicle 10 that embodies an example of the present invention. Vehicle 10 is a heavy truck that comprises a chassis 12 on which a body 14 is mounted. Chassis 12 comprises wheels that support the vehicle for travel. The left front wheel 16 appears in FIGS. 1 and 2. It is a steered wheel that revolves about a centerline 18. The word "wheel" is understood in the context of FIGS. 1 and 2 to refer to the assembly of several parts that include a rimmed metal wheel 20 on which a rubber tire 22 is mounted.

The left front portion of body 14 shown in FIGS. 1 and 2 illustrates what may be considered a wheel well, or fender, 24. Because of the particular nature of the vehicle shown here, the wheel well, or fender, is cooperatively defined by portions of several different body parts. One of those parts is a fender part 26 that is non-movably attached to the vehicle body. Another of those parts is a hood 28 that in the closed position shown encloses the engine compartment.

Hood 28 can be swung upward and forward in the sense indicated by arrow 30 in FIG. 1 when a hood latch 32 (see FIG. 2) at the left fender part 26 and a hood latch at a corresponding right fender part (not shown) are unlatched. With hood 28 closed, a portion 34 of it forms a portion of the wheel well, or fender, forward of fender part 26.

Body 14 comprises a cab 36 on chassis 12 rearward of hood 28. A driver's side door 38 of the cab provides for driver ingress and egress. Because of the height of cab 36 above ground level, steps 40, 42 are mounted at the side on chassis 12 below door 38. The steps are mounted on a fuel tank 44 which is in turn mounted on the chassis frame.

A downwardly concave, laterally outboard margin of wheel well, or fender, 24 includes a laterally outboard protruding eyebrow 46. A forward portion of the eyebrow is formed in hood 28 and a rearward portion in fender part 26. The wheel well, or fender, including the eyebrow, extends circumferentially about the wheel toward the rear of the vehicle, terminating at a trailing edge 48.

In accordance with principles of the invention, a splash and spray suppressor part 50 is mounted on vehicle 10 in association with wheel well, or fender, 24 at trailing edge 48. In the absence of suppressor part 50, steps 40, 42, tank 44, and the adjacent areas of the vehicle that are directly rearward of wheel 16 are exposed to splash and spray created by the action of the wheel on a wet or muddy surface along which the vehicle is traveling.

Figure 3:
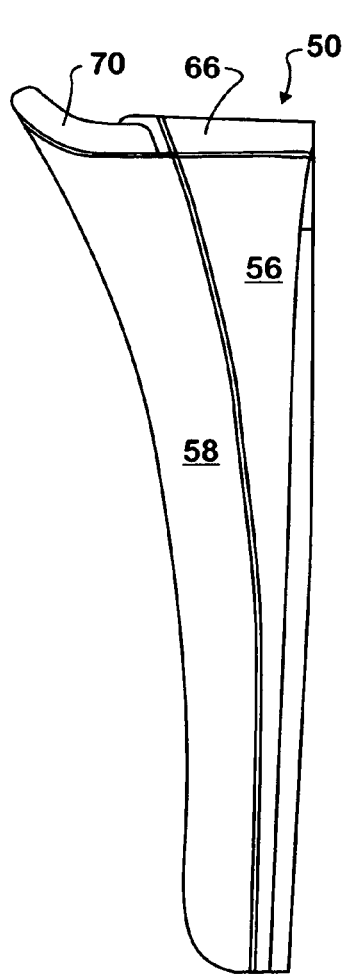
FIG. 3 is a left side elevation view of a first embodiment of accessory part according to the present invention.
Figure 4:
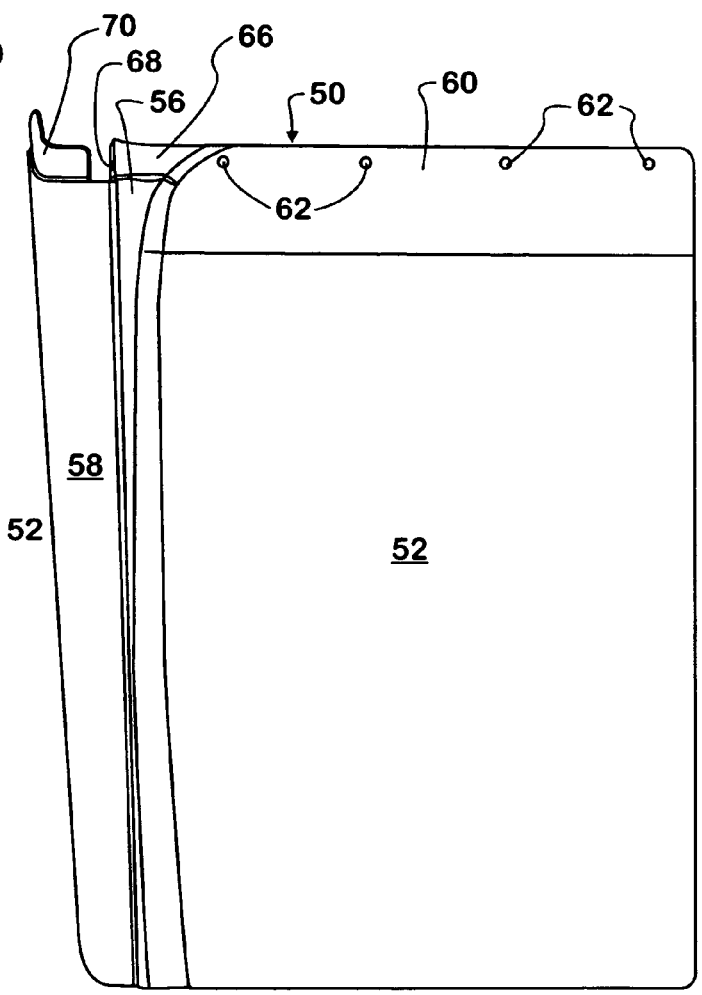
FIG. 4 is a rear elevation view of FIG. 3.
Figure 5:
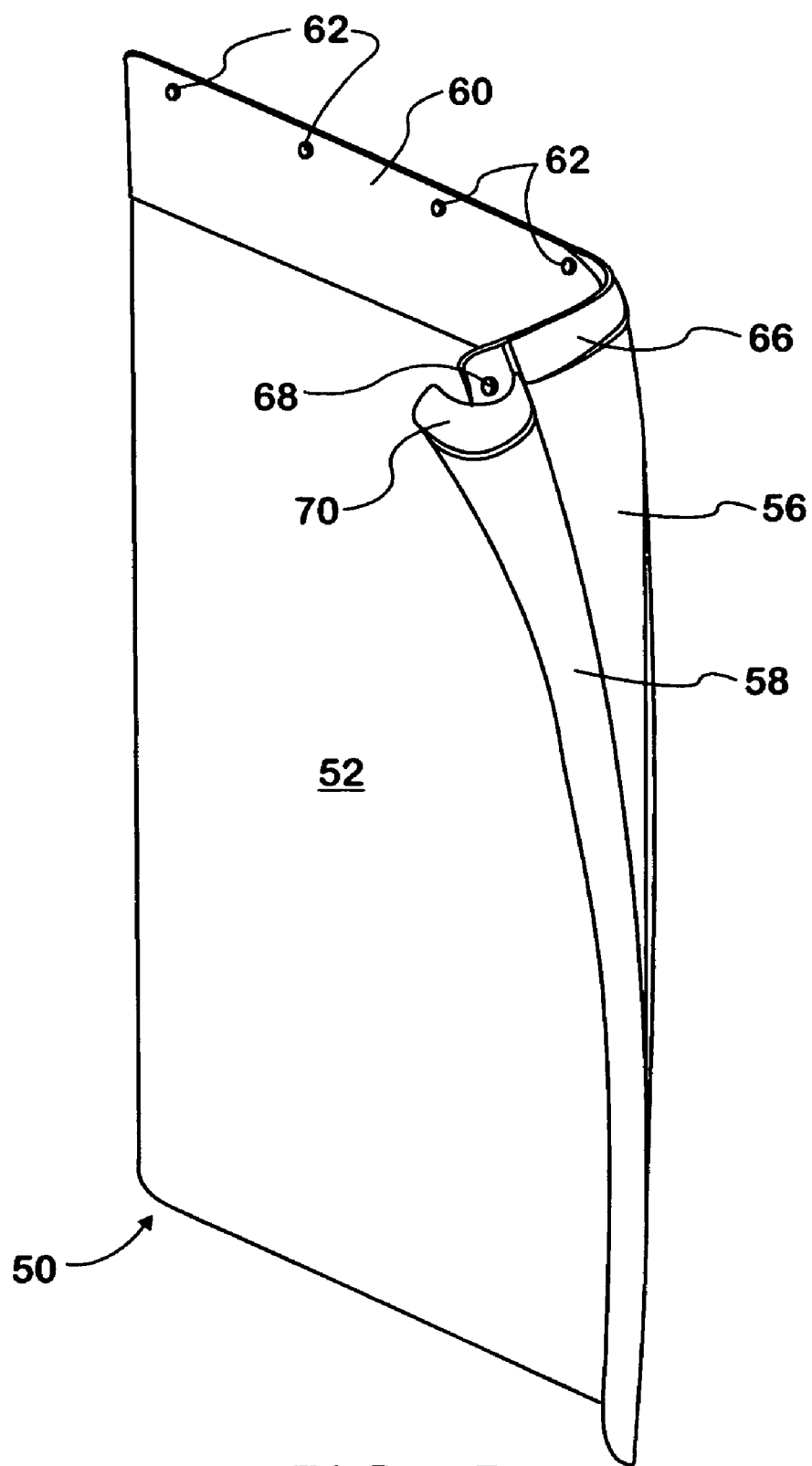
FIG. 5 is a perspective view of the first embodiment looking slightly downwardly from the left front toward the right rear.

Detail of suppressor part 50 is shown in FIGS. 3-5. Suppressor part 50 comprises a generally vertical, generally rectangular, first wall 52 that in FIGS. 1 and 2 is generally parallel to centerline 18 about which wheel 16 revolves when the front wheels are being steered so that vehicle 10 travels in a straight line. Suppressor part 50 further comprises a generally vertical second wall 56 that in FIGS. 1 and 2 extends forward of an outboard vertical side of wall 48, and a third wall 58, shown by FIGS. 1 and 2 to form a continuation of eyebrow 46, extending along a side of wall 56 opposite wall 52.

Wall 52 has a laterally inboard top margin 60 attached to a margin of the wheel well, or fender, contiguous with a portion of the trailing edge 48 that is laterally inboard of eyebrow 46. Margin 60 is inwardly offset from the rest of wall 52 to fit inside the wheel well, or fender. Holes 62 in margin 60 provide for fasteners 64 to fasten margin 60 to the wheel well, or fender. A top margin 66 of wall 56 also fits inside the wheel well, or fender, and has a hole 68 that allows it to be fastened to the wheel well, or fender, by a fastener.

A tab 70 projects circumferentially from the top margin of wall 58 in inwardly offset relation to the continuation of the eyebrow in part 50 to lodge behind a margin of the wheel well, or fender, contiguous with a portion of trailing edge 48 that includes eyebrow 46.

The inward offsets of tab 70 and top margins 60 and 66 relative to the portions of the respective walls below them allows part 50 to fit with the exterior surface of the adjoining walls substantially flush with the exterior surface of the wheel well, or fender.

A preferred method for making part 50 is by the injection molding of synthetic material—thermoplastic olefin is a preferred material—in a suitably shaped mold cavity to create a one-piece injection-molded part that is substantially rigid and durable.

Part 50 suppresses road splash and spray from wheel 16 helping to keep the area behind the wheel, especially steps 42, 40 free of mud and dirt kick up by the wheel as it revolves. In doing so, the part provides a more pleasing appearance because it continues the eyebrow feature already present around the wheel well, or fender. Because of part 50, wheel 16 looks more centered in the wheel well.

Although the drawings show only the left wheel, it can be understood that the right front of the vehicle has a wheel well, or fender, and suppressor part that are the mirror image of the left.

Figure 6:
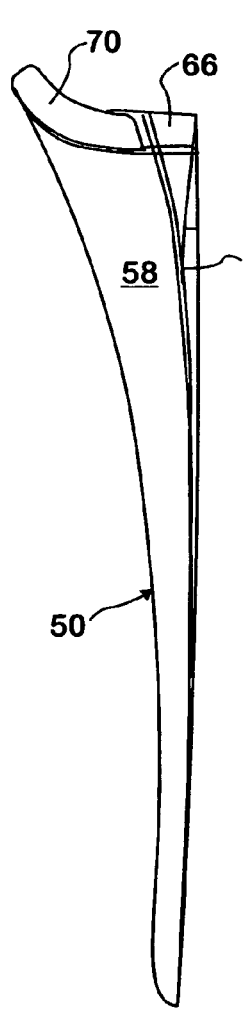
FIG. 6 is a left side elevation view of a second embodiment of accessory part according to the present invention.
Figure 7:
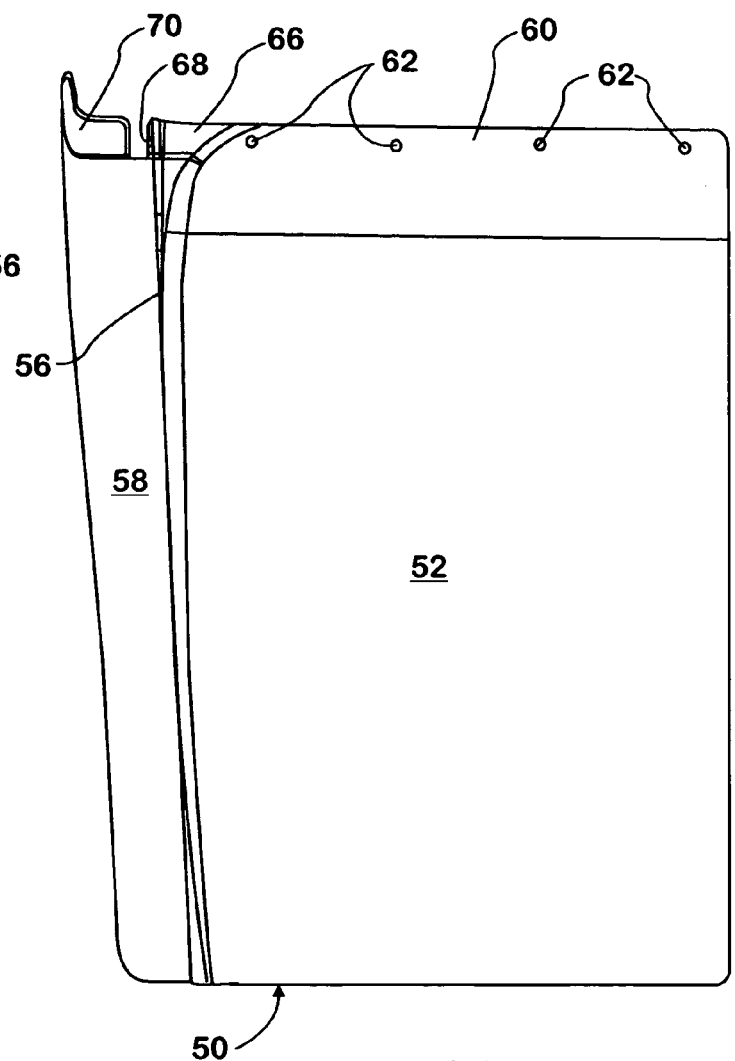
FIG. 7 is a rear elevation view of FIG. 6.
Figure 8:
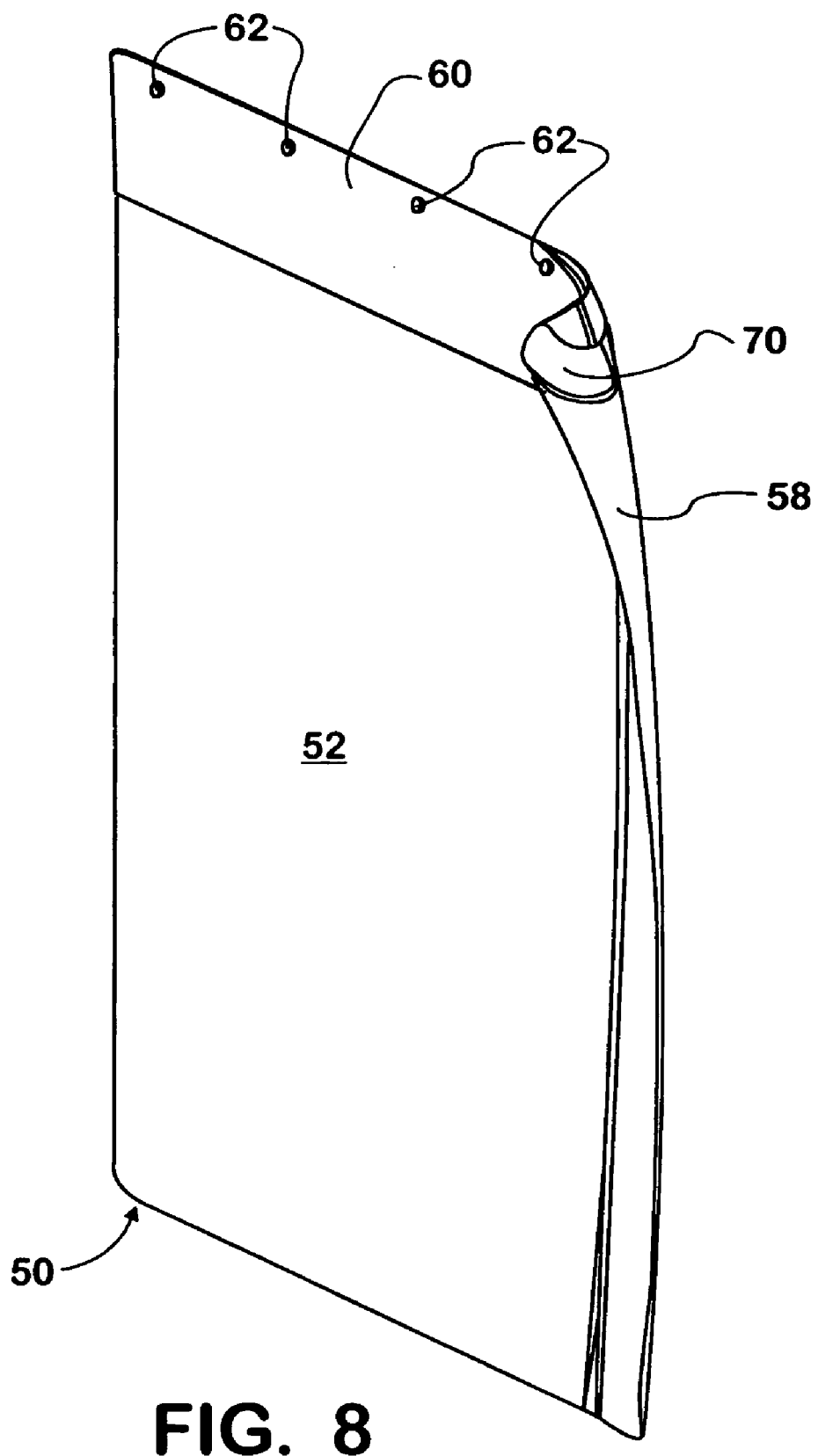
FIG. 8 is a perspective view of the second embodiment looking slightly downwardly from the left front toward the right rear.

Depending on the specific vehicle model and particular size of wheel, the shape of the suppressor part may be somewhat different from the example shown by FIGS. 1-5. FIGS. 6-8 show a second embodiment where the same reference numerals serve to designate the same features described in connection with FIGS. 1-5. The chief difference between FIGS. 3-5 and FIGS. 6-8 is in the size of wall 56, which is much narrower in the latter Figures.

While a presently preferred embodiment of the invention has been illustrated and described, it should be appreciated that principles of the invention apply to all embodiments falling within the scope of the following claims.

What is claimed is:

1. A land vehicle comprising:
   a chassis comprising wheels on which the vehicle travels;
   a body that is supported on the chassis and comprises a wheel well overlying a portion of the circumference of one of the wheels in spaced relation to the one wheel and ending at a trailing edge that is rearward of the one wheel when a centerline about which the one wheel revolves as the vehicle is traveling in a straight line is perpendicular to the direction of travel and that is at an elevation vertically above the centerline;
   at least a laterally outboard portion of the wheel well being formed by one or more exterior body panels to endow the wheel well with a downwardly concave laterally outboard margin, including a laterally outboard protruding eyebrow, extending to the trailing edge; and
   a further part that is attached to the vehicle in association with the wheel well to form a circumferential continuation of the wheel well, including a circumferential continuation of the eyebrow, from the trailing edge to an elevation vertically below the centerline.

2. A vehicle as set forth in claim 1 wherein the one wheel is a front steered wheel, the vehicle comprises a tank mounted on the chassis rearward of the one wheel, and the further part is disposed between the one wheel and the tank.

3. A vehicle as set forth in claim 1 wherein the one wheel is a front steered wheel, the vehicle comprises one or more steps for a person to enter into and exit from a cab of the body, and the further part is disposed between the one wheel and the one or more steps.

4. A vehicle as set forth in claim 3 wherein the one or more steps are mounted on a tank that is mounted on the chassis.

5. A vehicle as Set forth in claim 1 wherein the further part comprises a laterally inboard top margin attached to a margin of the wheel well contiguous with a portion of the trailing edge that is laterally inboard of the eyebrow, and a tab disposed laterally outboard of the laterally inboard top margin to project circumferentially from the continuation of the eyebrow in inwardly offset relation to the continuation of the eyebrow and lodge behind a margin of the wheel well contiguous with a portion of the trailing edge that includes the eyebrow.

6. A vehicle as set forth in claim 5 wherein the further part comprises a non-elastic one-piece part of synthetic material.

7. A vehicle as set forth in claim 1 wherein the further part comprises a generally vertical, generally rectangular first wall that is generally parallel to the wheel centerline when the vehicle is traveling in a straight line, a generally vertical second wall extending forward of an outboard side of the first wall, and a third wall that extends along a side of the second wall opposite the first wall to form the continuation of the eyebrow.

8. A vehicle as set forth in claim 7 wherein the first, second, and third walls are contained in a single piece of material to endow the further part with a one-piece unitary construction.

9. A vehicle as set forth in claim 8 wherein material of the further part comprises thermoplastic olefin.

10. A land vehicle comprising:
a chassis comprising wheels on which the vehicle travels;
a body that is supported on the chassis and comprises one or more parts forming a front fender having a downwardly facing, concave, laterally outboard margin that includes a laterally outwardly protruding eyebrow in spaced relation to a portion of the circumference of a front one of the wheels and ending at a trailing edge that is rearward of the front one of the wheels when a centerline about which the front one of the wheels revolves as the vehicle is traveling in a straight line is perpendicular to the direction of travel and that is at an elevation vertically above the centerline;
and a further part that is attached to, and extends from the trailing edge of, the fender to form a circumferential continuation of the fender, including a circumferential continuation of the eyebrow to an elevation vertically below the centerline.

11. A vehicle as set forth in claim 10 wherein the further part comprises a laterally inboard top margin attached to a margin of the fender contiguous with a portion of the trailing edge that is laterally inboard of the eyebrow, and a tab disposed laterally outboard of the laterally inboard top margin to project circumferentially from the continuation of the eyebrow in inwardly offset relation to the continuation of the eyebrow and lodge behind a margin of the fender contiguous with a portion of the trailing edge that includes the eyebrow.

12. A vehicle as set forth in claim 11 wherein the further part comprises a non-elastic one-piece part of synthetic material.

13. A vehicle as set forth in claim 10 wherein the further part comprises a generally vertical, generally rectangular first wall that is generally parallel to the wheel centerline when the vehicle is traveling in a straight line, a generally vertical second wall extending forward of an outboard side of the first wall, and a third wall that extends along a side of the second wall opposite the first wall to form the continuation of the eyebrow.

14. A vehicle as set forth in claim 13 wherein the first, second, and third walls are contained in a single piece of material to endow the further part with a one-piece unitary construction.

15. A vehicle as set forth in claim 14 wherein material of the further part comprises thermoplastic olefin.

16. A vehicle as set forth in claim 14 wherein the further part comprises a tab projecting circumferentially from the third wall in inwardly offset relation to the continuation of the eyebrow and lodging behind a margin of the fender contiguous with a portion of the trailing edge that includes the eyebrow.

* * * * *